Jan. 23, 1940. C. V. BUDDENBROCK 2,187,849
FISHING POLE
Filed Sept. 1, 1938 2 Sheets-Sheet 1
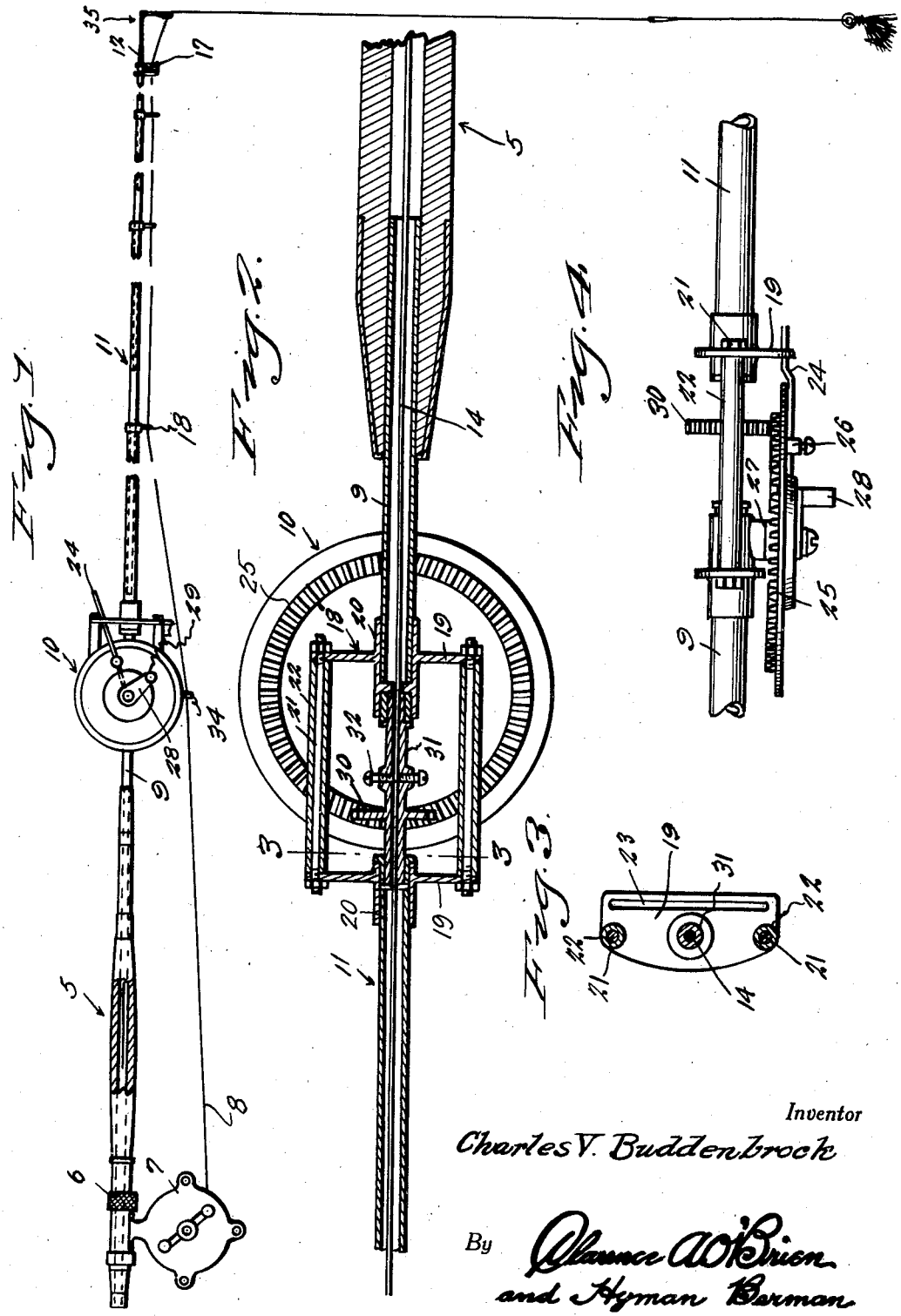
Inventor
Charles V. Buddenbrock
By Clarence A. O'Brien
and Hyman Berman
Attorneys Jan. 23, 1940.   C. V. BUDDENBROCK   2,187,849
FISHING POLE
Filed Sept. 1, 1938   2 Sheets-Sheet 2
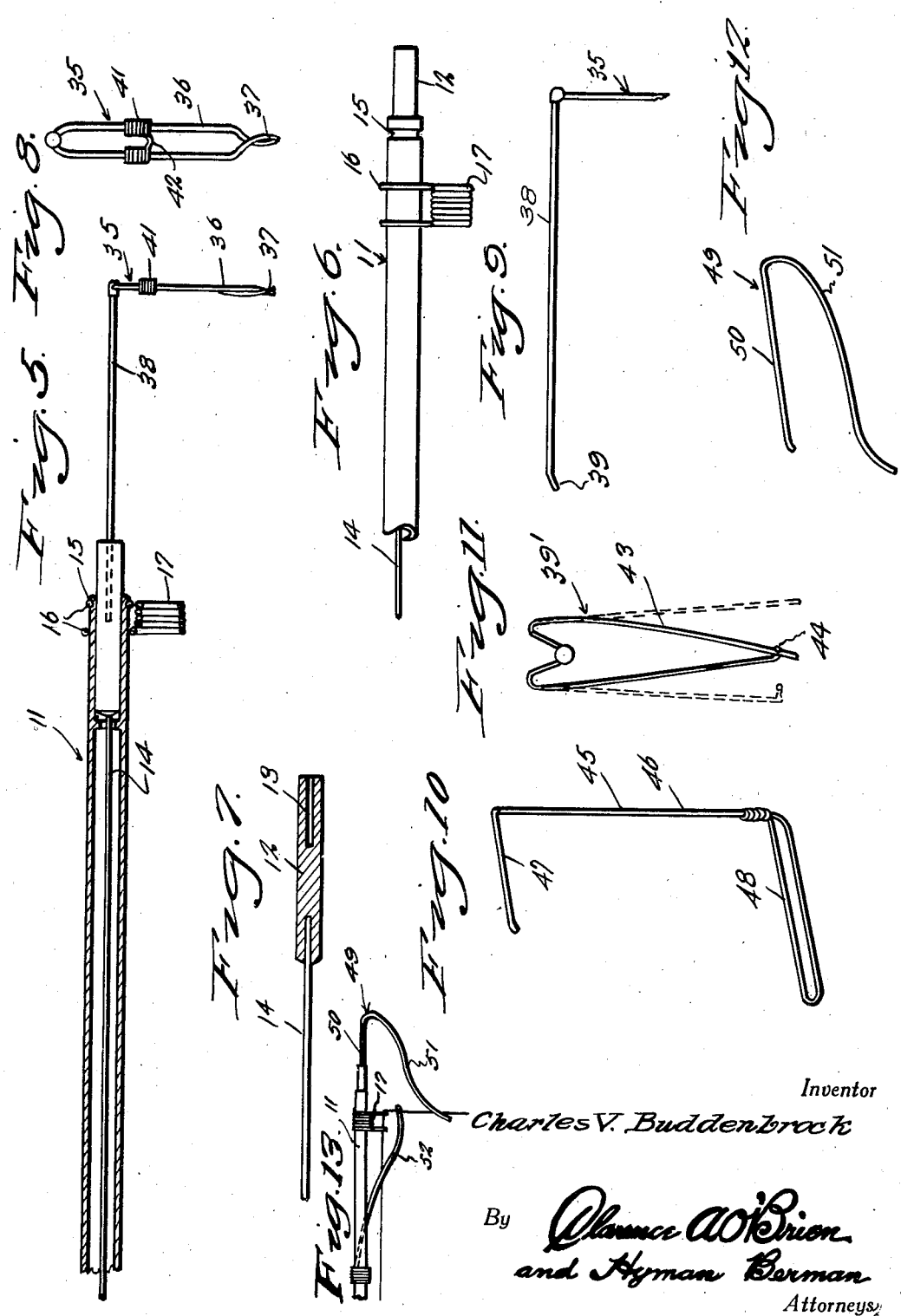
Inventor
Charles V. Buddenbrock
By Clarence A. O'Brien
and Hyman Berman
Attorneys Patented Jan. 23, 1940

2,187,849

UNITED STATES PATENT OFFICE 2,187,849

FISHING POLE

Charles V. Buddenbrock, Trinidad, Colo.

Application September 1, 1938, Serial No. 228,055

6 Claims. (Cl. 43—43)

This invention relates to fishing poles and has for the primary object the provision of a device of this character which may be readily increased in length and shortened to meet with different fishing conditions and including means for providing movement to the bait, so that fish will be readily attracted thereto and which permits artificial bait to simulate the movements produced by live bait without undue movement of the fishing pole by the fisherman.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a side elevation, partly in section, illustrating a fishing pole constructed in accordance with the present invention.

Figure 2 is a fragmentary vertical sectional view showing a portion of a means for imparting to the bait movements simulating live bait.

Figure 3 is a transverse sectional view taken on line 3—3 of Figure 2.

Figure 4 is a fragmentary top plan view illustrating the operating means.

Figure 5 is a fragmentary vertical sectional view illustrating a portion of the pole and a part of the means for imparting movement to the fishing line.

Figure 6 is a fragmentary side elevation illustrating a portion of the pole and a line guide thereon capable of being adjusted endwise of the pole.

Figure 7 is a fragmentary vertical sectional view illustrating a coupling element.

Figure 8 is a front elevation illustrating a line engaging element.

Figure 9 is a fragmentary side elevation showing a part of the line engaging element.

Figure 10 is a perspective view illustrating a modified form of line engaging element.

Figure 11 is a front elevation illustrating another modified form of line engaging element.

Figure 12 is a perspective view illustrating another form of line engaging element.

Figure 13 is a fragmentary side elevation, illustrating the form of line engaging element shown in Figure 12 applied to the pole or staff with a cam element associated therewith.

Referring in detail to the drawings, the numeral 5 indicates the handle or hand grip of a fishing pole provided with the usual clamps 6 for detachably mounting thereon a reel 7 of a standard construction and on which is wound the fishing line 8. Extending into the hand grip 5, at one end thereof with a frictional fit is a tube 9 on which is mounted an operating mechanism 10. The operating mechanism 10 is also mounted on the staff 11 of the pole. The mechanism 10 maintains the tube 9 in alignment with the staff 11. The staff 11 consists of a plurality of telescopic sections, as clearly shown in Figure 1, whereby the staff may be shortened and lengthened to meet with different fishing conditions. The staff 11 is of hollow or tubular formation and the end section at its free end has formed therein a journal to rotatably support a coupling element 12 in the form of a rod of a selected length having sockets 13 extending inwardly from each end. An operating rod 14 extends through the staff 11, operating mechanism 10 into the tube 9 and a portion of the hand grip 5 which is of hollow formation to receive one end of the operating rod. The other end of the operating rod has a tight fit with one of the sockets 13 of the coupling element 12. The coupling element extends a limited distance outwardly of the end of the staff 11 and said end has a groove 15 forming a seat for a mounting 16 of a line guide or eye 17. The staff 11 adjacent to the operating mechanism 10 is provided with a guide or eye 18 for the line 8. The guide or eye 17 is constructed of a coiled member, as clearly shown in Figure 5, on which are formed the mountings 16 each being in the form of an eye to slidably engage with the staff 11 and when one of said mountings is in engagement with the groove or seat 15 will hold the guide or eye 17 against sliding movement on the staff 11. However, the guide or eye 17 may be moved inwardly of the free end of the staff when desired by exerting pressure thereon sufficient to move one of the mountings out of the seat or groove 15.

The operating mechanism 10 consists of a frame 18' having end members 19 integral with sleeves 20, one of which has a frictional fit with the tube 9 and the other a frictional fit with the staff 11. The end members or plates 19 are connected by tie bolts 21 on which are mounted spacing sleeves 22 engageable with the end members or plates 19. One of the end members or plates 19 has a guide slot 23 for slidably receiving a member 24 forming a part of the operating mechanism 10 for limiting the rotation of the operating mechanism. The member 24 is eccentrically and detachably mounted on a drive gear 25, as shown at 26, and said drive gear is journaled on a stub shaft 27 formed on one of the sleeves 20 of the frame 18'. The drive gear has a crank handle 28 for the manual rotation thereof. The member 24 operating in the guide slot 23 of the frame will limit the rotation of the drive gear 25 and detachably connected to the crank handle 28 is a coil spring 29, the other end of which is connected onto the frame. The coil spring acts to rotate the drive gear 25 in a reverse direction after the crank handle has been turned in an opposite direction manually and is limited in its movement by the member 24 engaging one end of the slot 23. Thus it will be seen that through the manual rotation of the gear in one direction by the crank handle and the release of the latter said gear will be rotated in a reverse direction by the spring 29 and will be limited in its rotation in opposite directions by the member 24 operating in the slot 23. The drive gear meshes with a gear 30 secured on a shaft 31 journaled in the sleeve 29 and this shaft has a bore through which the operating rod 14 extends and also is equipped with opposed set screws 32 adapted to be turned in engagement with the operating rod 14 for releasably securing the latter to the shaft 31 so that as the gear 25 is rotated in opposite directions as described the operating rod 14 will be rotated in opposite directions. Whenever it is desired to rotate the operating rod 14 in one direction manually the member 24 is removed from the drive gear and the spring 29 is disconnected from the crank handle 28. The drive gear may then be rotated continuously in one direction which in turn rotates the operating rod 14 continuously in one direction.

The frame 18' carries a guide eye 34 through which the fishing line 8 may travel on its way from the reel 7 to the guide eye 18 to prevent the fishing line from becoming entangled with the operating mechanism 10.

A line engaging element is indicated by the character 35 and consists of an elongated loop 36 split at one end by having the ends of the material from which the loop 36 is made bent to form overlapping ends 37. The opposite end of the loop 36 is pivotally connected to one end of an attaching rod 38, the other end of which is received in one of the sockets 13 of the coupling element 12. The end of the rod 38 received in the sockets 13 is slightly offset, as shown at 39, so as to have frictional contact with the walls of the socket and thereby prevent accidental detachment of the operating rod from the coupling element. The parallel portions of the loop 36 have slidably mounted thereon sleeve-like elements 41 connected together, as shown at 42, for the purpose of holding the side portions of the elongated loop contracted, the normal tendency of the side portions of the loops being to spread apart and bring about separation of the overlapped ends 37. The overlapped ends 37 when separated permits the fishing line to be readily inserted in the loop 36 of the line engaging member 35. By sliding the sleeve-like portions 41 towards the overlapped ends 37, the latter will be held in overlapped relation to prevent the line from moving accidentally out of the loop 36. However, when a fish pulls strenuously on the line, the latter may move out of the loop by way of the overlapped ends 37, thereby freeing the line of the line engaging member 35 so that the fish may be reeled in in the ordinary way through the operation of the reel 7.

As shown in Figure 5, the line engaging element is spaced a distance from the guide eye 17 and with the fishing line passing through both as shown in Figure 1, and through the manual operation of the operating mechanism 10 the line will be jerked and then released, consequently imparting movement to the artificial bait similar to the movement of live bait.

It will be seen through the mechanism described and shown in the drawings that the artificial bait may be moved about in the water without undue movement of the fishing pole by the fisherman, consequently permitting the bait to be moved in the water where the fisherman is standing or located in inaccessible places where it is not convenient to cast or move the pole. It is to be understood that the operating mechanism may be employed for the movement of the bait in the water at any time desired by the fisherman and not necessarily used when in restricted places. When using the type of line engaging element designated by the character 35 the operating rod 14 is rotated in opposite direction to the operating mechanism 10 as heretofore described in detail. Also the operating rod 14 is rotated in opposite directions when the line engaging element 39' is employed which is clearly shown in Figure 11. The line engaging element 39' is journaled on a connecting rod similar in construction to the connecting rod 38 and includes resilient side members 43 normally tending to spread apart and one of the side members at the free end is formed to provide a hook 44 adapted to engage with the other side member for holding said side members contracted into loop formation through which the line may be passed. When the line 8 is given a strenuous pull by the fish the hook 44 will disengage from the other side member and consequently permit both side members to separate, as shown in dotted lines in Figure 11, consequently freeing the fishing line from the element 39'.

The form of line engaging element shown in Figure 10 and designated by the character 45, consists of a rod 46 bent at one end to extend at right angles to provide an attaching rod 47 received in one of the sockets of the coupling element. The element 45 is further bent to provide an elongated loop-shaped member 48 paralleling the attaching rod 47 and through which the fishing line is passed after leaving the eye 17. The line engaging element 45 is rotated a limited distance in opposite directions during the reeling in of the line, so that the bait will move in the water in a zig-zag path, simulating flies or insects which fall into the water in an attempt to get out of the water, consequently readily attracting fish to the bait.

Referring to the form of line engaging element 49 shown in Figure 12, it consists of an attaching rod 50 to enter one of the sockets of the coupling element and is bent back on itself to form a line engaging portion 51, having a compound curvature. The line engaging element 49 is to be rotated in one direction and operating in conjunction therewith is a cam element 52, as shown in Figure 13. The cam element 52 is slidably mounted on the staff 11 and also rotatably mounted thereon and may be adjusted about the staff with the latter acting as an axis therefor. The cam element 52 acts to prevent the line from tangling or wrapping about the staff 11 during the rotation of the line engaging element 49. The portion 51 of said line engaging element 49 engages and disengages with the line during the rotation of said line engaging element 49 to impart movement to the line for effecting a quivering movement to the bait of the line. By adjusting the position of the cam element 52 the amount of movement of the bait may be varied.

By adjusting the guide eye 17 on the staff 11 its location with respect to the line engaging member rotatable relative to the staff may be varied which will increase or decrease the action of the line engaging element on the line in accordance with the direction of adjustment of the guide eye on the staff of the pole.

It is believed that the foregoing description, when taken in connection with the accompanying drawings, will fully set forth the construction and advantages of this invention to those skilled in the art to which such a device relates, so that further detailed description will not be necessary.

What is claimed is:

1. A fishing pole comprising a hollow telescopic staff, a frame connected to said staff, a handle connected to said frame and supported in alignment with the staff by the frame and carrying a fishing reel, guides on the staff to receive a line fed off the reel, a shaft rotatably supported by the frame and in alignment with the handle and staff, an operating rod detachably connected to said shaft and extending into the staff, means for rotating said shaft in one direction and in opposite directions, a coupling element connected with said operating rod and projecting out of the free end of the staff, and a line engaging element connected to the operating rod by the coupling element to engage and disengage with the line for the purpose of imparting a jerking movement thereto.

2. A fishing pole comprising a hollow telescopic staff, a frame connected to said staff, a handle connected to said frame and supported in alignment with the staff by the frame and carrying a fishing reel, guides on the staff to receive a line fed off the reel, a shaft rotatably supported by the frame and in alignment with the handle and staff, an operating mechanism mounted on the staff and connected to said shaft whereby the latter may be rotated in one direction or in reverse direction, an operating rod detachably connected to said shaft and extending into the staff, a coupling element connected with said operating rod and projecting out of the free end of the staff, a drive gear journaled on said frame and including a crank handle for the rotation thereof, a gear meshing with the drive gear and secured on the shaft, and means connected with the operating rod by the coupling element to engage the fishing line to impart a jerking movement thereto.

3. A fishing pole comprising a hollow telescopic staff, a frame connected to said staff, a handle connected to said frame and supported in alignment with the staff by the frame and carrying a fishing reel, guides on the staff to receive a line fed off the reel, a shaft rotatably supported by the frame and in alignment with the handle and staff, an operating rod detachably connected to said shaft and extending into the staff, a coupling element connected with said operating rod and projecting out of the free end of the staff, a drive gear journaled on said frame and including a crank handle for the rotation thereof, a gear meshing with the drive gear and secured on the shaft, means for limiting the rotation of the drive gear in opposite directions, and removable therefrom, and means connected to the operating rod by the coupling element to engage the line to impart a jerking movement thereto.

4. A fishing pole comprising a hollow telescopic staff, a frame connected to said staff, a handle connected to said frame and supported in alignment with the staff by the frame and carrying a fishing reel, guides on the staff to receive a line fed off of the reel, a shaft rotatably supported by the frame and in alignment with the handle and staff, an operating rod detachably connected to said shaft and extending into the staff, a coupling element connected with said operating rod and projecting out of the free end of the staff, a drive gear journaled on said frame and including a crank handle for the rotation thereof, a gear meshing with the drive gear and secured on the shaft, means for limiting the rotation of the drive gear in opposite directions and removable therefrom, means connected to the operating rod by the coupling element to engage the line to impart a jerking movement thereto, and a spring detachably connected to the crank handle and to the frame for turning the drive gear in one direction after being manually rotated in an opposite direction and the crank handle released.

5. A fishing pole comprising a staff, an operating means connected to said staff and including an operating rod extending through said staff and having a coupling element, a handle connected to the operating means and adapted to have a fishing reel mounted thereon, guides mounted on the staff to receive a line fed off of the fishing reel and one of said guides being adjustable endwise of the staff, and a line engaging means connected to the operating rod by the coupling element to engage the line to impart a jerking movement thereto.

6. A fishing pole comprising a staff, an operating means connected to said staff and including an operating rod extending through said staff and having a coupling element, a handle connected to the operating means and adapted to have a fishing reel mounted thereon, guides mounted on the staff to receive a line feed off of the fishing reel, and one of said guides being adjustable endwise of the staff, and a line engaging element releasably connected to the operating rod and including a portion to engage and disengage with the line during the rotation of the operating rod for imparting a jerking movement to the line.

CHARLES V. BUDDENBROCK.